(12) United States Patent
Onizuka

(10) Patent No.: US 12,434,465 B2
(45) Date of Patent: Oct. 7, 2025

(54) RF TAG LAMINATE MANUFACTURING METHOD AND RF TAG LAMINATE

(71) Applicant: BRIDGESTONE CORPORATION, Tokyo (JP)

(72) Inventor: Nobuyuki Onizuka, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 64 days.

(21) Appl. No.: 18/550,778

(22) PCT Filed: Nov. 24, 2021

(86) PCT No.: PCT/JP2021/043056
§ 371 (c)(1),
(2) Date: Sep. 15, 2023

(87) PCT Pub. No.: WO2023/276189
PCT Pub. Date: Jan. 5, 2023

(65) Prior Publication Data
US 2024/0169177 A1    May 23, 2024

(30) Foreign Application Priority Data
Jun. 30, 2021    (JP) .................... 2021-109730

(51) Int. Cl.
*B32B 37/00*    (2006.01)
*B32B 3/18*    (2006.01)
(Continued)

(52) U.S. Cl.
CPC .............. *B32B 37/003* (2013.01); *B32B 3/18* (2013.01); *B32B 25/042* (2013.01); *B32B 37/10* (2013.01);
(Continued)

(58) Field of Classification Search
CPC ....... B32B 37/003; B32B 37/10; B32B 37/20; B32B 3/18; B32B 25/042; B32B 38/0004;
(Continued)

(56) References Cited

U.S. PATENT DOCUMENTS

2020/0164605 A1    5/2020    Yoshida

FOREIGN PATENT DOCUMENTS

| CN | 102054195 A | 5/2011 | |
| EP | 2172878 A2 * | 4/2010 | ....... G06K 19/07718 |

(Continued)

OTHER PUBLICATIONS

Machine translation of JPH11272831 date unknown.*
(Continued)

*Primary Examiner* — John L Goff, II
(74) *Attorney, Agent, or Firm* — KENJA IP LAW PC

(57) ABSTRACT

A method of manufacturing RF tag laminates includes an RF tag arranging step, a second rubber sheet layer stacking step, and a roller pressure-bonding step, wherein, in the RF tag arranging step, a plurality of RF tags 10 are arranged on a first rubber sheet layer 11*a* in a manner such that long sides 10*a*L of a rectangular shape of an IC chip 10*a* of each RF tag 10 in the plurality of RF tags 10 are inclined with respect to a direction RMV orthogonal to a relative movement direction RM of a first roller 3*a* in a plan view.

9 Claims, 6 Drawing Sheets

(51) Int. Cl.
  *B32B 25/04* (2006.01)
  *B32B 37/10* (2006.01)
  *B32B 37/20* (2006.01)
  *B32B 38/00* (2006.01)
  *G06K 19/07* (2006.01)

(52) U.S. Cl.
  CPC .......... *B32B 37/20* (2013.01); *B32B 38/0004* (2013.01); *G06K 19/0723* (2013.01); *B32B 2319/00* (2013.01); *B32B 2457/00* (2013.01)

(58) Field of Classification Search
  CPC ............ B32B 2319/00; B32B 2457/00; B29C 66/342; Y10T 156/1089; Y10T 156/1093; Y10T 156/1095; Y10T 156/1097; G06K 19/0723; G06K 19/07764
  USPC ......................................................... 156/87
  See application file for complete search history.

(56) References Cited

FOREIGN PATENT DOCUMENTS

| | | |
|---|---|---|
| JP | H11272831 A | 10/1999 |
| JP | 2006178566 A | 7/2006 |
| JP | 2017132292 A | 8/2017 |
| JP | 2020083044 A | 6/2020 |
| WO | WO-2020225668 A1 * | 11/2020 ......... B29D 30/0061 |

OTHER PUBLICATIONS

Aug. 1, 2024, search result of the Extended European Search Report issued by the European Patent Office in the corresponding European Patent Application No. 21948492.0.

Feb. 8, 2022, International Search Report issued in the International Patent Application No. PCT/JP2021/043056.

Dec. 14, 2023, International Preliminary Report on Patentability issued in the International Patent Application No. PCT/JP2021/043056.

* cited by examiner

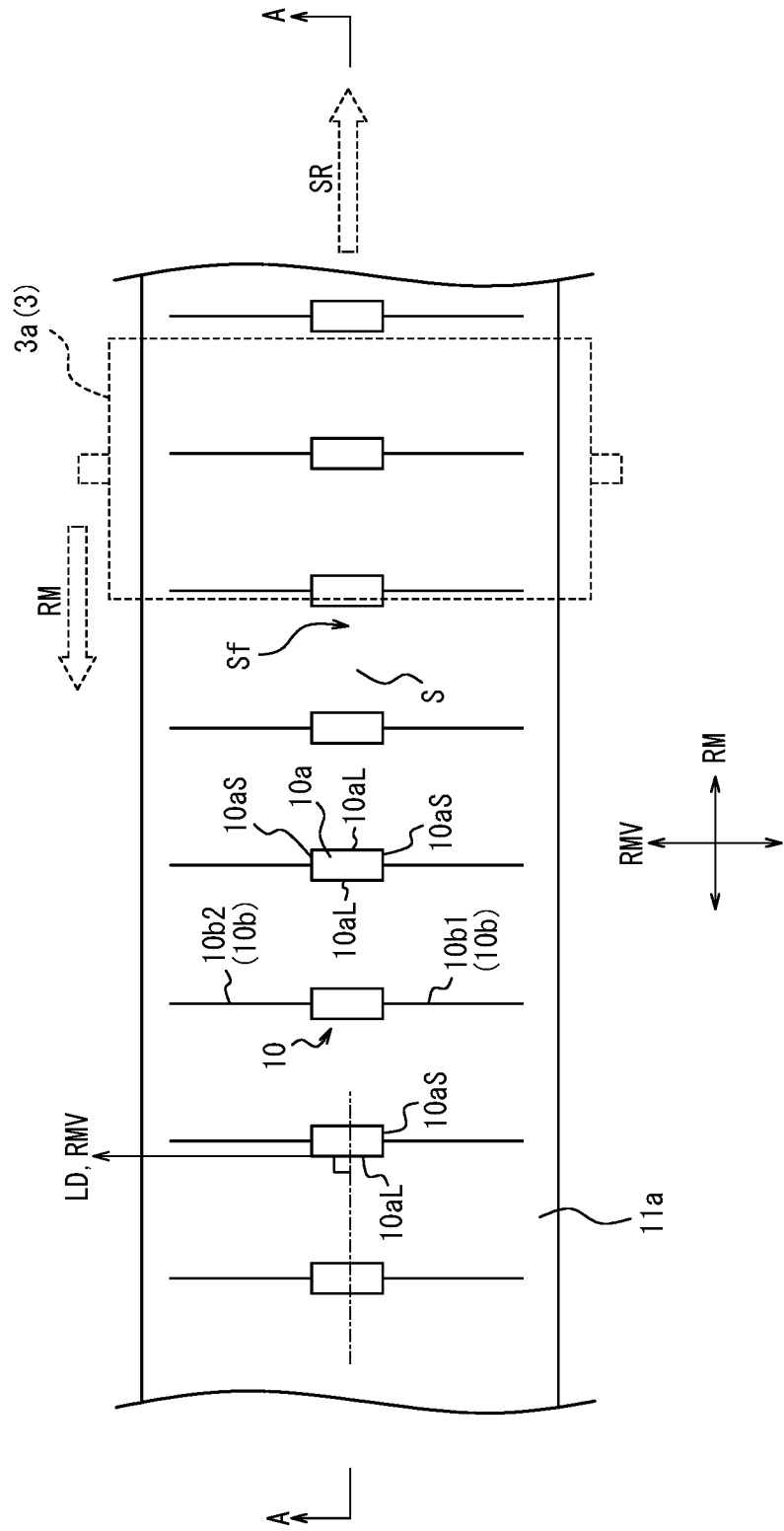

RF TAG LAMINATE MANUFACTURING METHOD AND RF TAG LAMINATE

TECHNICAL FIELD

The present disclosure relates to a method of manufacturing RF tag laminates, and an RF tag laminate.

BACKGROUND

It has been known to embed an RF tag that includes a memory or the like capable of storing unique identification information or the like into a rubber article, such as a tire (for example, Patent Literature 1). This configuration enables, for example, various kinds of information obtained from the memory of the RF tag to be used for maintenance services or the like of the rubber article, such as the tire.

CITATION LIST

Patent Literature

PTL 1: JP 2017-132292 A

SUMMARY

Technical Problem

When the RF tag is embedded into the rubber article, such as the tire, the RF tag may be embedded into the rubber article as an RF tag laminate in which the RF tag is sandwiched and stacked between coating rubber layers, so as to improve durability and adhesiveness to rubber members constituting the rubber article.

In manufacturing such RF tag laminates, it is possible to obtain a plurality of RF tag laminates at once with high productivity, for example, by arranging a plurality of RF tags on a rubber sheet layer, placing another rubber sheet layer on top, and pressure-bonding them together. At this time, however, air can remain between each rubber sheet layer and the RF tags, and it may degrade the durability of the resulting RF tag laminates.

It would be helpful to provide a method of manufacturing RF tag laminates by which highly durable RF tag laminates can be obtained with high productivity, and a highly durable RF tag laminate.

Solution to Problem

One aspect of the present disclosure resides in a method of manufacturing RF tag laminates that each includes: an RF tag that has an IC chip with a rectangular shape in a plan view, and an antenna connected to at least one of short sides of the rectangular shape of the IC chip; and coating rubber that is stacked on the RF tag so as to coat an outer surface of the RF tag, the method including:

the RF tag arranging step of arranging a plurality of RF tags side-by-side on a first rubber sheet layer, which is to form part of the coating rubber, in a manner such that the plurality of RF tags are spaced apart from each other;

the second rubber sheet layer stacking step, performed after the RF tag arranging step, of stacking the second rubber sheet layer, which is to form another part of the coating rubber, on the first rubber sheet layer and the plurality of RF tags; and the roller pressure-bonding step, performed after the second rubber sheet layer stacking step, of pressure-bonding the first rubber sheet layer, the plurality of RF tags, and the second rubber sheet layer to each other using a first roller configured to move on, and relative to, the first rubber sheet layer, the plurality of RF tags, and the second rubber sheet layer, wherein in the RF tag arranging step, the plurality of RF tags are arranged on the first rubber sheet layer in a manner such that long sides of the rectangular shape of the IC chip of each RF tag in the plurality of RF tags are inclined with respect to a direction orthogonal to a relative movement direction of the first roller in the plan view.

Another aspect of the present disclosure resides in an RF tag laminate that is manufactured by the above method.

Advantageous Effect

According to the present disclosure, the method of manufacturing RF tag laminates by which highly durable RF tag laminates can be obtained with high productivity, and the highly durable RF tag laminate are provided.

BRIEF DESCRIPTION OF THE DRAWINGS

In the accompanying drawings:

FIG. 6 is a plan view illustrating an RF tag arranging step in a method of manufacturing RF tag laminates according to a comparative example.

DETAILED DESCRIPTION

Figure 1:
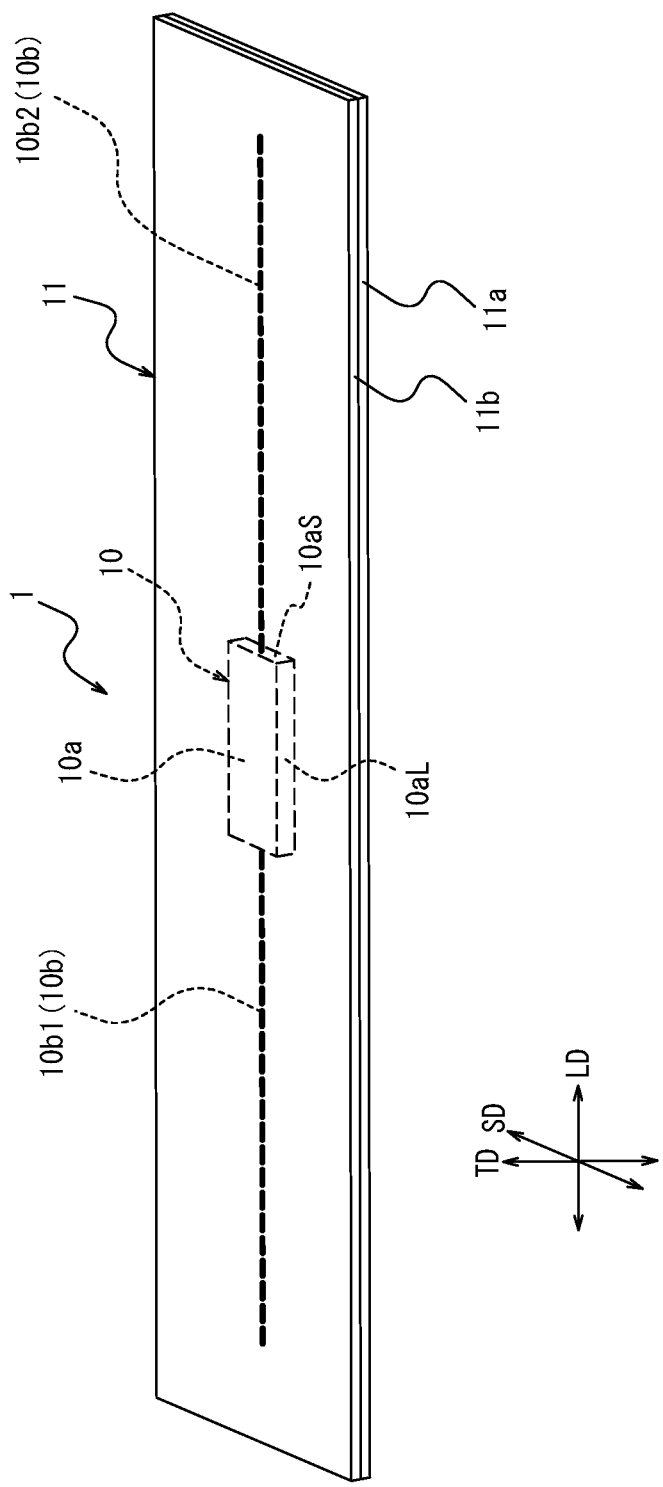
FIG. 1 is a perspective view schematically illustrating an example of an RF tag laminate obtained by a method of manufacturing RF tag laminates according to an embodiment of the present disclosure.

An RF tag laminate obtained by a method of manufacturing RF tag laminates according to the present disclosure is suitably used in any rubber articles, and particularly suitably used in tires.

Embodiments of the method of manufacturing RF tag laminates and an RF tag laminate according to the present disclosure will be illustrated by way of example with reference to the drawings.

In the drawings, the same components are denoted by the same reference numerals.

First, an RF tag laminate that is to be obtained by the method of manufacturing RF tag laminates, or that is eventually obtained by the manufacturing method, will be explained with reference to FIGS. 1 and 2.

FIG. 1 is a perspective view schematically illustrating an example of an RF tag laminate obtained by the method of manufacturing RF tag laminates according to an embodiment of the present disclosure. FIG. 2 is a plan view schematically illustrating an example of an RF tag in an RF tag laminate obtained by the method of manufacturing RF tag laminates according to an embodiment of the present disclosure.

As illustrated in FIG. 1, the RF tag laminate 1 in these examples includes an RF tag 10 and coating rubber 11.

The RF tag 10 has an IC chip 10a with a rectangular shape (refer to FIG. 2 or the like) (in these examples, a rectangular shape used in a narrow sense) in a plan view (in other words, the IC chip 10a has a rectangular outer contour in the plan view), and an antenna 10b connected to at least one (in these examples, both) of short sides 10aS of the rectangular shape of the IC chip 10a.

The "RF tag" is also generally referred to as a "radio frequency identification (RFID) tag."

The RF tag can be configured to perform wireless communication with the outside.

Here, the "rectangular shape" herein refers to a rectangular shape used in a narrow sense (hereinafter, simply referred to as a "rectangular shape") and a square shape. In a case in which the rectangular shape refers to a square shape, a "long side of the rectangular shape" refers to any one side of the square shape, and a "short side of the rectangular shape" refers to another side adjacent to the one side. Additionally, the apexes of the rectangular shape may be slightly rounded from the viewpoint of preventing damage to other components adjacent to the IC chip, for example.

Furthermore, herein, for each RF tag, a direction parallel to the direction of extension of long sides 10aL (refer to FIG. 2 or the like) of the rectangular shape in the plan view is referred to as a "long-side direction LD," a direction parallel to the direction of extension of short sides 10aS of the rectangular shape in the plan view is referred to as a "short-side direction LS," and a direction perpendicular to the long-side direction LD and the short-side direction LS is referred to as a "thickness direction TD." The "plan view" refers to a view of the RF tag 10 seen from the thickness direction TD.

Moreover, herein, for example, the expressions "the antenna 10b is connected to short sides 10aS of the rectangular shape in the plan view of the IC chip 10a", or "in the plan view, the antenna 10b is connected to short sides 10aS of the rectangular shape of the IC chip 10a" more specifically means that the "antenna 10b is connected to end faces of the IC chip 10a that include the short sides 10aS of the rectangular shape (in the plan view) of the IC chip 10a and that do not include long sides 10aL of the rectangular shape." However, unless otherwise specified, the former two expressions will be used in order to avoid complexity of expression.

The coating rubber 11 is stacked on the RF tag 10, so as to coat an outer surface of the RF tag 10.

The coating rubber 11 includes a first rubber sheet layer 11a, which coats the RF tag 10 from one side of the thickness direction TD (more specifically, in these examples, from a lower side during later-described manufacturing), and a second rubber sheet layer 11b, which coats the RF tag 10 from the other side of the thickness direction TD (more specifically, in these examples, from an upper side during later-described manufacturing).

The first rubber sheet layer 11a and the second rubber sheet layer 11b can be formed from unvulcanized raw rubber. By forming the first rubber sheet layer 11a and the second rubber sheet layer 11b from unvulcanized raw rubber, its adhesive properties allow the first rubber sheet layer 11a and the second rubber sheet layer 11b, and thus the first rubber sheet layer 11a, the RF tag 10, and the second rubber sheet layer 11b, to be firmly bonded to each other by, for example, pressure-bonding using a roller during later-described manufacturing, without having to use an adhesive agent.

It is preferable to form the first rubber sheet layer 11a and the second rubber sheet layer 11b from the same kind of rubber, from the viewpoint of bonding properties, for example. However, the first rubber sheet layer 11a and the second rubber sheet layer 11b may be formed from different kinds of rubber.

As will be described later, the first rubber sheet layer 11a and the second rubber sheet layer 11b may be formed in a predetermined planar shape different from that of FIG. 1 at the time of manufacturing RF tag laminates 1.

Figure 2:
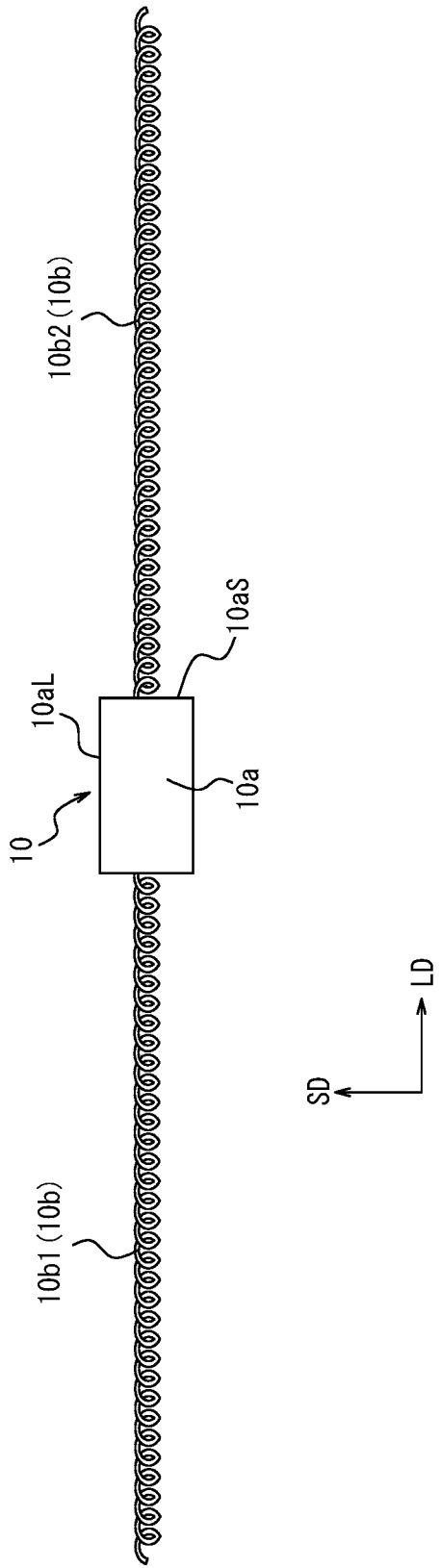
FIG. 2 is a plan view schematically illustrating an example of an RF tag in an RF tag laminate obtained by the method of manufacturing RF tag laminates according to an embodiment of the present disclosure.

The IC chip 10a constituting the RF tag 10, in these examples, has a rectangular shape in the plan view, as illustrated in FIGS. 1 and 2. That is, in these examples, IC chip 10a has a cuboid shape.

However, the IC chip 10a may also have a square shape in the plan view. That is, IC chip 10a may have a cube shape.

In the plan view, the IC chip 10a has two long sides 10aL mutually facing each other, and two short sides 10aS mutually facing each other.

The IC chip 10a may constitute a controller and/or a memory when the RF tag 10 performs wireless communication. The IC chip 10a may be operated by induced electromotive force produced by electromagnetic waves received by one or more antennas.

The antenna 10b constituting the RF tag 10 is, in these examples, connected to both the (i.e., two mutually facing) short sides 10aS of the rectangular shape of the IC chip 10a in the plan view, as illustrated in FIGS. 1 and 2. In other words, the antenna 10b includes a first antenna 10b1 connected to one short side 10aS of the IC chip 10a, and a second antenna 10b2 connected to the other short side 10aS of the IC chip 10a.

However, the antenna 10b may be connected to only one of the short sides 10aS of the rectangular shape of the IC chip 10a in the plan view. In other words, the antenna 10b may have only one of the first antenna 10b1 and the second antenna 10b2. That is, it is sufficient for the antenna 10b to be connected to at least one of the short sides 10aS of the rectangular shape of the IC chip 10a in the plan view.

In a case in which the antenna 10b includes the first antenna 10b1 and the second antenna 10b2, their direction of extension (the direction of extension as a whole, not that along a helical shape or the like as illustrated in the example of FIG. 2), their shape (the helical shape or the like illustrated in the example of FIG. 2), and their length (the length over which the antennas extend, that is, the distance between ends of the antennas) can be the same as the examples of FIGS. 1 and 2, but at least one of these can be different.

In these examples, as illustrated in FIG. 2, the antenna 10b (each of the first antenna 10b1 and the second antenna 10b2), in its entirety in a longitudinal direction, helically extends from the short sides 10aS of the IC chip 10a.

However, the antenna 10b (the first antenna 10b1 and/or the second antenna 10b2), in its entirety in the longitudinal direction, may extend from the short sides 10aS of the IC chip 10a in a straight line, a wavy line (substantially two-dimensional wavy line, which applies hereinafter), or a zigzag line (substantially two-dimensional zigzag line, which applies hereinafter).

The antenna 10b (the first antenna 10b1 and/or the second antenna 10b2) may also extend from the short sides 10aS of the IC chip 10*a*, by presenting two or more of helical, straight line, wavy line, and zigzag line shapes in any order. For example, the antenna 10*b* (the first antenna 10*b*1 and/or the second antenna 10*b*2) may extend from the short sides 10*a*S of the IC chip 10*a*, by first presenting a helical shape (or a wavy line or a zigzag line) and then presenting a straight line from an end thereof, or it may extend from the short sides 10*a*S of the IC chip 10*a*, by first presenting a straight line and then presenting a helical shape (or a wavy line or a zigzag line) from an end thereof, or it may extend from the short sides 10*a*S of the IC chip 10*a*, by first presenting a helical shape (or a wavy line or a zigzag line), then presenting a straight line from an end thereof, and finally presenting a helical shape (or a wavy line or a zigzag line) from an end thereof.

However, from the viewpoint of air escape through the antenna 10*b* during later-described manufacturing, since air can easily travel inside a helical shape, at least part in the longitudinal direction of the antenna 10*b* preferably extends in a helical shape, and its entirety in the longitudinal direction preferably extends in a helical shape, as in the example of FIG. 2.

In these examples, as illustrated in FIGS. 1 and 2, in the plan view, the antenna 10*b* (each of the first antenna 10*b*1 and the second antenna 10*b*2), in its entirety in the longitudinal direction, extends from the short sides 10*a*S of the IC chip 10*a* along the long-side direction LD (i.e., in a direction parallel to the direction of extension of the long sides 10*a*L of the rectangular shape of the IC chip 10*a*). In other words, in these examples, the antenna 10*b* (each of the first antenna 10*b*1 and the second antenna 10*b*2), in its entirety in the longitudinal direction, extends in a straight line extending along the long-side direction LD.

However, it is not necessarily essential that the antenna 10*b* (the first antenna 10*b*1 and/or the second antenna 10*b*2), in its entirety in the longitudinal direction, extend in a straight line extending along the long-side direction LD, and part thereof in the longitudinal direction may extend in a polygonal line or a curved line extending in a direction different from the long-side direction LD.

Nevertheless, from the viewpoint of air escape through the antenna 10*b* during later-described manufacturing (more specifically, during a roller pressure-bonding step), the antenna 10*b*, in its entirety in the longitudinal direction, preferably extends along the long-side direction LD (i.e., in the direction parallel to the direction of extension of the long sides 10*a*L of the rectangular shape of the IC chip 10*a*).

The antenna 10*b* (the first antenna 10*b*1 and/or the second antenna 10*b*2) can be made of metal.

The antenna 10*b* (the first antenna 10*b*1 and/or the second antenna 10*b*2) can be configured to provide a communication function when the RF tag performs wireless communication with the outside.

The mode of connection between the IC chip 10*a* and the antenna 10*b* may be freely determined without particular limitation. For example, the antenna 10*b* may be connected to the IC chip 10*a* by solder or the like.

Additionally, although not illustrated, in addition to the IC chip 10*a* and the antenna 10*b*, the RF tag 10 may include coating resin that coats and reinforces an outer surface of at least part of the IC chip 10*a* and the antenna 10*b* (e.g., a connected portion between the IC chip 10*a* and the antenna 10*b*, or the entire IC chip 10*a* and the connected portion between the IC chip 10*a* and the antenna 10*b*). This improves the durability of the RF tag compared to a case in which the RF tag 10 does not include coating resin. In a case in which the RF tag 10 includes coating resin, the entire outer surface of the IC chip 10*a*, the antenna 10*b*, and the coating resin is coated with the coating rubber 11, so as to form an RF tag laminate 1.

Furthermore, although not illustrated, in addition to the IC chip 10*a* and the antenna 10*b*, or in a case in which the RF tag 10 includes the aforementioned coating resin, in addition to the IC chip 10*a*, the antenna 10*b*, and the coating resin, the RF tag 10 may include an antenna (hereinafter, also referred to as "additional antenna") separate from the antenna 10*b* that extends in the long-side direction LD in a helical shape surrounding at least part of the IC chip 10*a* and the antenna 10*b* (e.g., the entire IC chip 10*a*, or the entire IC chip 10*a* and at least part of the antenna 10*b*) (in other words, so that at least part of IC chip 10*a* and the antenna 10*b* described above is included in the helical shape). The additional antenna may, but does not need to, be in contact or connection with the IC chip 10*a*. The additional antenna can be configured to function as a dipole antenna, and in this case, communication strength can be increased. With a helical configuration, the additional antenna can further facilitate air escape during later-described manufacturing. In a case in which the RF tag 10 includes the aforementioned additional antenna, the entire outer surface of the IC chip 10*a*, the antenna 10*b*, and the additional antenna, or in a case in which the RF tag 10 includes the aforementioned coating resin, the entire outer surface of the IC chip 10*a*, the antenna 10*b*, the coating resin, and the additional antenna, is to be coated with the coating rubber 11, so as to form an RF tag laminate 1.

Next, the method of manufacturing RF tag laminates according to an embodiment of the present disclosure will be explained with reference to FIGS. 3 to 5.

Figure 3:
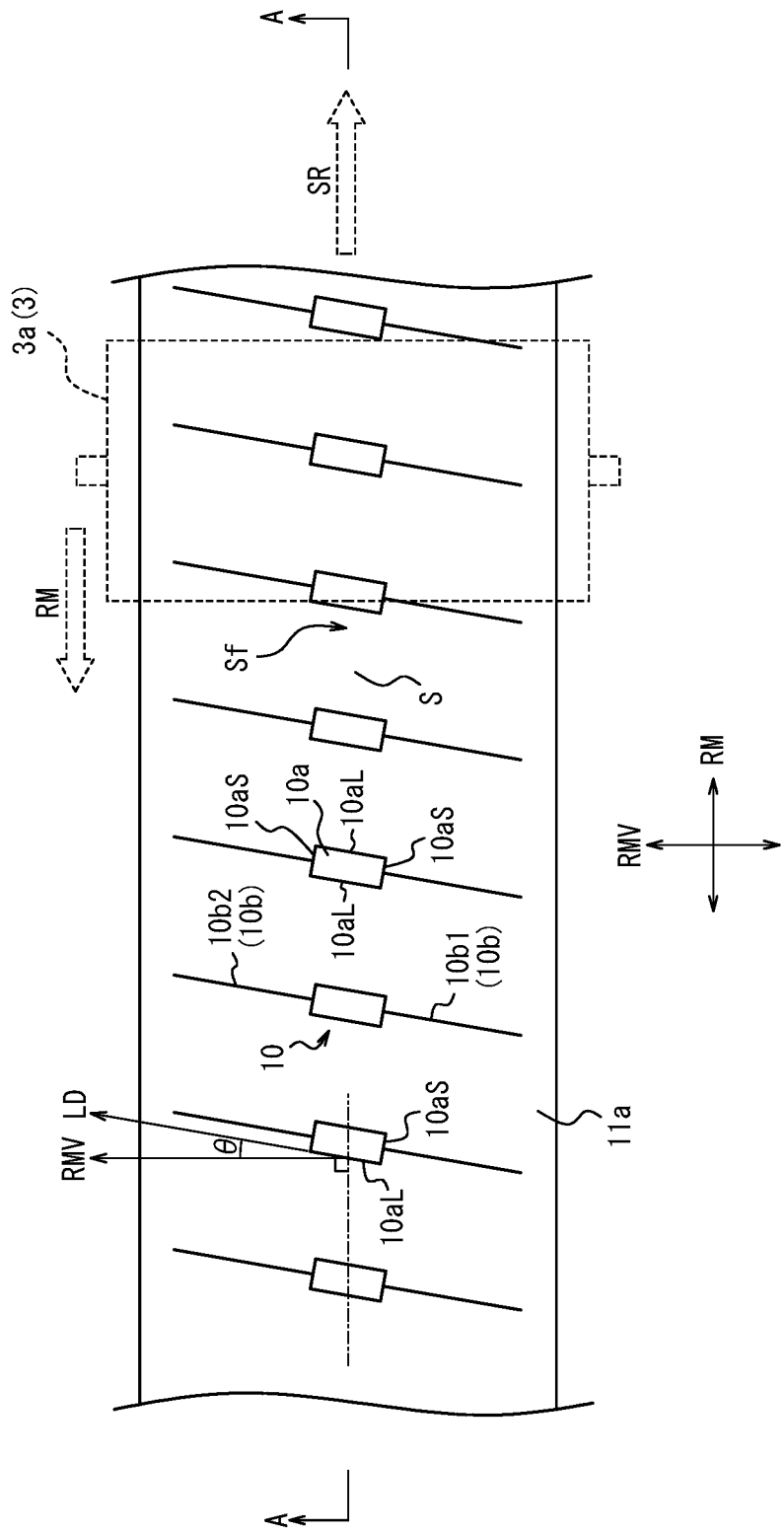
FIG. 3 is a plan view illustrating an RF tag arranging step in the method of manufacturing RF tag laminates according to an embodiment of the present disclosure.

FIG. 3 is a plan view illustrating an RF tag arranging step in the method of manufacturing RF tag laminates according to an embodiment of the present disclosure. In FIG. 3, a roller used in the subsequent roller pressure-bonding step is also illustrated by dotted lines. FIG. 4 is a partial cross-sectional side view corresponding to the A-A section of FIG. 3 that illustrates the roller pressure-bonding step in the method of manufacturing RF tag laminates according to an embodiment of the present disclosure. FIG. 5 is a flowchart illustrating the method of manufacturing RF tag laminates according to an embodiment of the present disclosure.

The method of manufacturing RF tag laminates according to an embodiment of the present disclosure explained below includes a first rubber sheet layer placing step (Step S101), the RF tag arranging step (Step S102), the second rubber sheet layer stacking step (Step S103), the roller pressure-bonding step (Step S104), and an RF tag laminate cutting step (Step S105) in this order.

(First Rubber Sheet Layer Placing Step)

First, in the first rubber sheet layer placing step, the first rubber sheet layer 11*a*, which is to form part of the coating rubber 11 included in the RF tag laminates 1 to be obtained by the manufacturing method according to the present embodiment, is placed on an appropriate stand 2, which is not illustrated (Step S101).

The stand 2, on which the first rubber sheet layer 11*a* can be placed stably and substantially horizontally, may be any stand.

(RF Tag Arranging Step)

In the RF tag arranging step performed after the first rubber sheet layer placing step, as illustrated in FIG. 3, a plurality of RF tags 10 are arranged side-by-side on the first rubber sheet layer 11*a*, which is to form part of the coating rubber 11 included in the RF tag laminates 1 to be obtained by the manufacturing method according to the present embodiment and which has been placed on the stand 2 in the first rubber sheet layer placing step, in a manner such that the plurality of RF tags 10 are spaced apart from each other (Step S102).

Any RF tag 10 explained above with reference to FIGS. 1 and 2 can be used as each of the plurality of RF tags 10. In the examples of FIGS. 3 and 4, each of the plurality of RF tags 10 has the IC chip 10a with a rectangular shape in the plan view, the first antenna 10b1, and the second antenna 10b2 of FIG. 2. In the plan view, the first antenna 10b1 and the second antenna 10b2, in their entireties in the longitudinal direction, extend along the long-side direction LD (i.e., in a direction parallel to the direction of extension of the long sides 10aL of the rectangular shape of the IC chip 10a), and they have the same shape and length. In the examples of FIGS. 3 and 4, the plurality of RF tags 10 each have the same shape and dimension.

More specifically, in the present embodiment, as illustrated in FIG. 3, the plurality of RF tags 10 are arranged side-by-side on the first rubber sheet layer 11a, in a manner such that the long sides 10aL of the rectangular shape of respective IC chips 10a (in other words, respective IC chips 10a included in adjacent RF tags 10) face each other and are spaced apart from each other in the plan view. In the later-described roller pressure-bonding step, a first roller 3a moves on, and relative to, the first rubber sheet layer 11a, the plurality of RF tags 10, and the second rubber sheet layer 11b, in a direction intersecting the long sides 10aL of the rectangular shape of the IC chips 10a.

However, it is not necessarily essential to arrange the plurality of RF tags 10 side-by-side in a manner such that the long sides 10aL of the rectangular shape of the respective IC chips 10a face each other and are spaced apart from each other. For example, the plurality of RF tags 10 may be arranged side-by-side in a manner such that the antenna 10b (the first antennas 10b1 and the second antennas 10b2), in its entirety in the longitudinal direction, extends in a straight line along the long-side direction LD and that ends of the antennas 10b included in adjacent RF tags 10 oppose each other and are spaced apart from each other. In other words, the plurality of RF tags 10 may be arranged so as to be spaced apart from each other, in a manner such that each RF tag 10, in its entirety, extends in a straight line along a later-described relative movement direction RM of the first roller 3a (in even other words, in a manner such that a later-described inclination angle θ is 90°).

Nevertheless, especially from the viewpoint of productivity, the plurality of RF tags 10 are preferably arranged side-by-side on the first rubber sheet layer 11a in a manner such that the long sides 10aL of the rectangular shape of the respective IC chips 10a face each other and are spaced apart from each other.

As illustrated in FIG. 3, in the present embodiment, the first rubber sheet layer 11a, which is placed on the stand 2 in the aforementioned first rubber sheet layer placing step, and thus, on which the RF tags 10 are placed in the RF tag arranging step, is in a strip shape having a predetermined width (width in an up and down direction in FIG. 3) and extending in the longitudinal direction (a right and left direction in FIG. 3) in the plan view. In the RF tag arranging step, the plurality of RF tags 10 are arranged side-by-side along the longitudinal direction of the first rubber sheet layer 11a (i.e., side-by-side and spaced apart in a direction parallel to the longitudinal direction).

This can reduce, for example, the amount of rubber that is not to form part of resulting RF tag laminates and is to be discarded, compared to a case in which the first rubber sheet layer 11a with a shape other than the strip shape is used, thus allowing for more efficient manufacturing of the RF tag laminates.

The aforementioned predetermined width of the first rubber sheet layer 11a may be freely determined, as long as it is greater than the length in a width direction of the first rubber sheet layer 11a of the RF tags to be arranged on the first rubber sheet layer 11a. However, from the viewpoint of reducing waste rubber in the later-described RF tag laminate cutting step, the width of the first rubber sheet layer 11a is preferably less than or equal to twice, and more preferably less than or equal to 1.5 times, the length in the width direction of the first rubber sheet layer 11a of the RF tags 10 to be arranged on the first rubber sheet layer 11a. Furthermore, from the viewpoint of leaving a certain amount of coating rubber around the RF tags 10 in the plan view of the RF tag laminates to be manufactured, for example, the width of the first rubber sheet layer 11a is preferably more than or equal to 1.2 times, and more preferably more than or equal to 1.3 times, the length in the width direction of the first rubber sheet layer 11a of the RF tags 10 to be arranged on the first rubber sheet layer 11a.

In the present embodiment, as illustrated in FIG. 3, the width of the first rubber sheet layer 11a is constant along the longitudinal direction of the first rubber sheet layer 11a. However, it is not necessarily essential for the width of the first rubber sheet layer 11a to be constant along the longitudinal direction of the first rubber sheet layer 11a.

In the RF tag arranging step, the plurality of RF tags 10 are arranged on the first rubber sheet layer 11a (refer to FIG. 3), in a manner such that the long sides 10aL (and thus the long-side direction LD) of the rectangular shape of the respective IC chips 10a of the plurality of RF tags 10 arranged on the first rubber sheet layer 11a are inclined with respect to a direction RMV orthogonal to the relative movement direction RM of the first roller 3a in the later-described roller pressure-bonding step (i.e., the inclination angle θ of FIG. 3 is not 0°) in the plan view.

An advantageous effect of this will be described in detail later.

Here, the "relative movement direction RM of the first roller 3a" refers to a direction in which the first roller 3a moves relative to targets to be pressure-bonded by the first roller 3a in the later-described roller pressure-bonding step (in the example of FIG. 5, which will be described later, the second rubber sheet layer 11b, and thus, a stacked sheet in which the first rubber sheet layer 11a, the plurality of RF tags 10, and the second rubber sheet layer 11b are stacked). When the orientation of the relative movement direction RM of the first roller 3a is not considered, the relative movement direction RM is identical with (i.e., parallel to) a direction SR in which the stacked sheet in which the first rubber sheet layer 11a, the plurality of RF tags 10, and the second rubber sheet layer 11b are stacked moves relative to the first roller 3a in the later-described roller pressure-bonding step (refer to FIGS. 3 and 4). When the orientation is considered, the relative movement direction RM of the first roller 3a and the relative movement direction SR of the stacked sheet are opposite to each other.

In the present embodiment, as illustrated in FIG. 3, the relative movement direction RM of the first roller 3a is identical with the longitudinal direction of the first rubber sheet layer 11a, and the direction RMV orthogonal to the relative movement direction RM of the first roller 3a is identical with the width direction of the first rubber sheet layer 11a and a direction parallel to a rotation axis of the first roller 3a.

In the plan view, the inclination angle θ (refer to FIG. 3) of the long sides 10aL (and thus the long-side direction LD) of the rectangular shape of each IC chip 10a with respect to the direction RMV orthogonal to the relative movement direction RM of the first roller 3a in the RF tag arranging step may be any angle other than 0°, as long as adjacent RF tags 10 are arranged with appropriate spacing without contacting each other.

For example, the aforementioned inclination angle θ may be 90°.

However, from the viewpoint of balance between production efficiency and air removal in the later-described roller pressure-bonding step, the aforementioned inclination angle θ (angle on the acute side) is preferably less than 90°, more preferably 8° to 15°, and most preferably approximately 10°. When the angle θ is 8° or more, air can be more effectively removed in the roller pressure-bonding step. When the angle θ is 15° or less, more sufficient spacing can be created between adjacent RF tags, and production efficiency in the later-described RF tag laminate cutting step or the like can be improved.

In the example of FIG. 3, all the plurality of RF tags 10 arranged on the first rubber sheet layer 11a have the same direction of extension (i.e., long-side direction LD) as each other (i.e., the directions of extension of all the longitudinal sides 10aL are parallel to each other). However, it is not necessarily essential for all the plurality of RF tags 10 to have the same direction of extension (i.e., long-side direction LD) as each other, and some RF tags 10 may have different directions of extension.

In the example of FIG. 3, respective adjacent RF tags 10 are arranged on the first rubber sheet layer 11a with the same spacing in the relative movement direction RM of the first roller 3a (and thus, in the longitudinal direction of the first rubber sheet layer 11a), but it is not necessarily essential that all the spacing be the same, and some of them may be arranged with different spacing.

Furthermore, in the example of FIG. 3, the plurality of RF tags 10 arranged on the first rubber sheet layer 11a are all arranged side-by-side along the longitudinal direction of the first rubber sheet layer 11a, so that a center in the longitudinal direction of each IC chip 10a coincides with a center in the width direction of the first rubber sheet layer 11a. However, the RF tags 10 may be arranged in a manner such that the centers in the longitudinal direction of IC chips 10a of at least some of the plurality of RF tags 10a do not coincide with the center in the width direction of the first rubber sheet layer 11a, or in a manner such that the centers in the longitudinal direction of IC chips 10a of at least some of the plurality of RF tags 10a are located at different positions in the width direction of the first rubber sheet layer 11a.

Nevertheless, from the viewpoint of the ease of obtaining a plurality of homogeneous RF tag laminates 1, for example, it is preferable to arrange the RF tags 10 on the first rubber sheet layer 11a as illustrated in FIG. 3 in the plan view of the RF tag arranging step.

(Second Rubber Sheet Layer Stacking Step)

In the second rubber sheet layer stacking step performed after the RF tag arranging step, although not illustrated, the second rubber sheet layer 11b, which is to form another part of the coating rubber 11, is stacked on the first rubber sheet layer 11a and the plurality of RF tags 10 that have been arranged in the RF tag arranging step (Step S103).

The shape and dimension of the second rubber sheet layer 11b used in the second rubber sheet layer stacking step may be freely determined without particular limitation, as long as the plurality of RF tags 10 arranged on the first rubber sheet layer 11a can be completely covered between the second rubber sheet layer 11b and the first rubber sheet layer 11a. The second rubber sheet layer 11b may be, for example, a large single piece or may be divided. The second rubber sheet layer 11b may, for example, be in a strip shape similar to the first rubber sheet layer 11a of FIG. 3 that has a width substantially equivalent to that of the first rubber sheet layer 11a of FIG. 3 and that extends in the longitudinal direction.

(Roller Pressure-Bonding Step)

Figure 4:
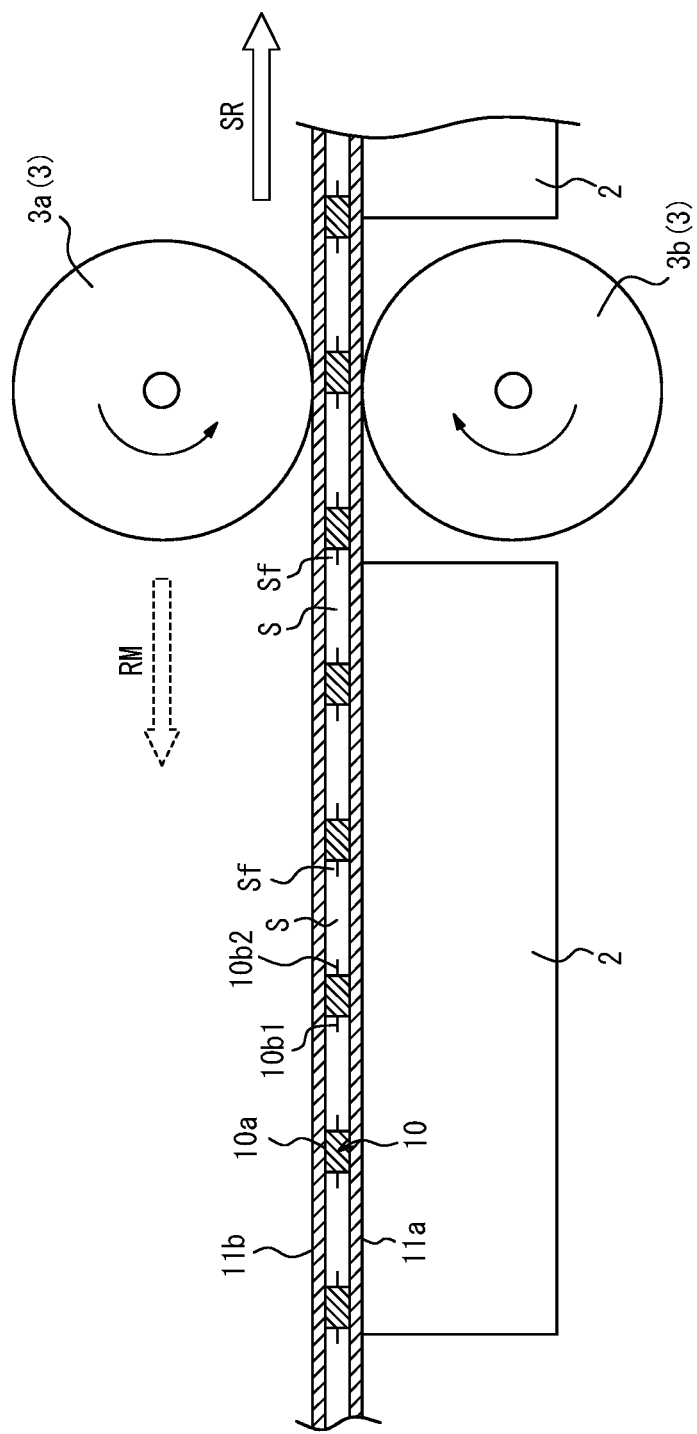
FIG. 4 is a partial cross-sectional side view corresponding to the A-A section of FIG. 3 that illustrates a roller pressure-bonding step in the method of manufacturing RF tag laminates according to an embodiment of the present disclosure.
Figure 5:
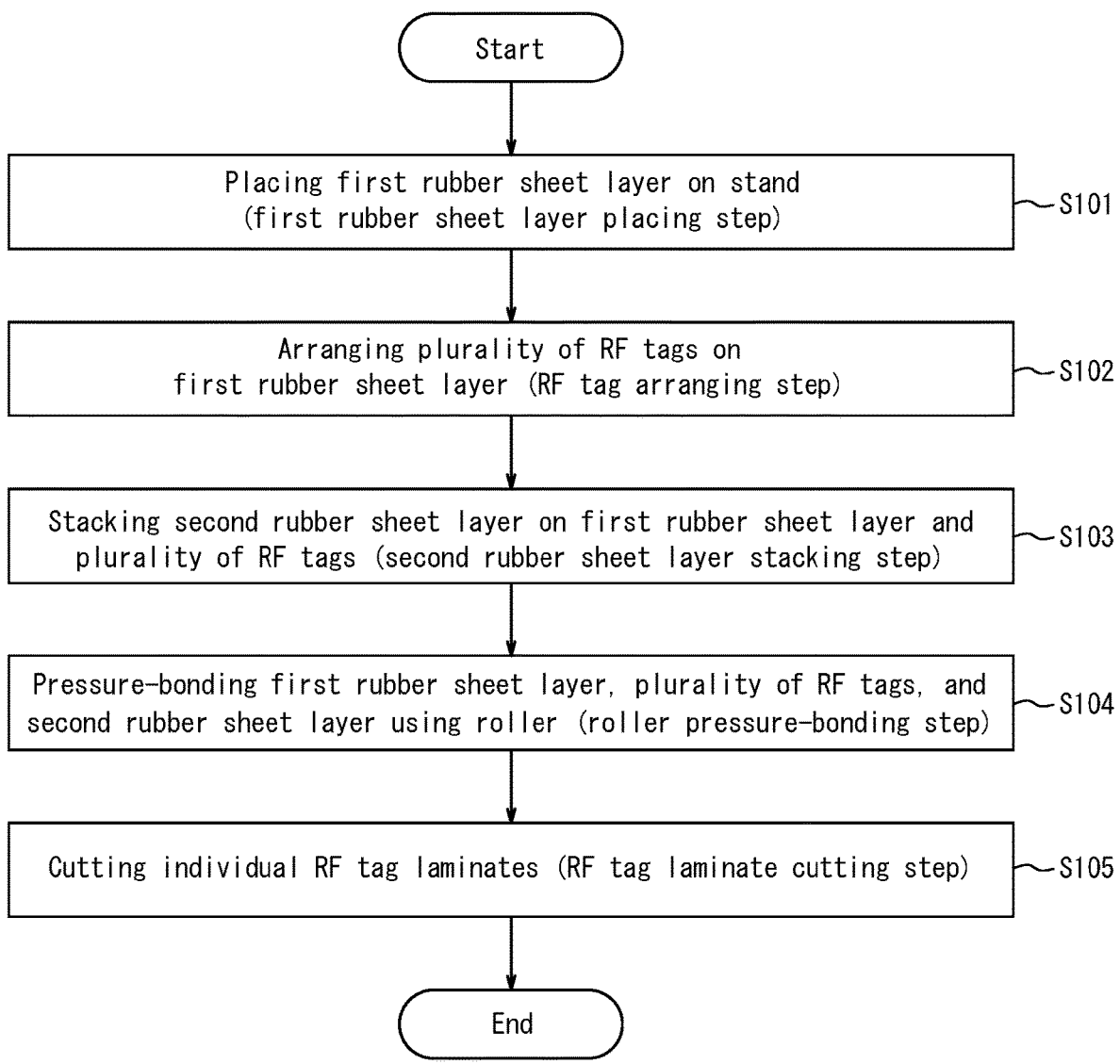
FIG. 5 is a flowchart illustrating the method of manufacturing RF tag laminates according to an embodiment of the present disclosure.

In the roller pressure-bonding step performed after the second rubber sheet layer stacking step, as illustrated in FIG. 4, the first rubber sheet layer 11a, the plurality of RF tags 10, and the second rubber sheet layer 11b that have been stacked in the second rubber sheet layer stacking step (in other words, the stacked sheet including the first rubber sheet layer 11a, the plurality of RF tags 10, and the second rubber sheet layer 11b) (hereinafter, these are collectively referred to as the "stacked sheet") are pressure-bonded to each other by the first roller 3a that moves on, and relative to, the first rubber sheet layer 11a, the plurality of RF tags 10, and the second rubber sheet layer 11b (stacked sheet) (Step S104).

In the roller pressure-bonding step, the first rubber sheet layer 11a and the second rubber sheet layer 11b (refer to FIG. 4) that are spaced apart from each other in the up and down direction via a gap S between adjacent RF tags 10 on a front side of the relative movement direction RM of the first roller 3a (the left side in FIGS. 3 and 4) are gradually pressure-bonded and adhered to each other by the first roller 3a that moves on, and relative to, the stacked sheet, and eventually, all of the first rubber sheet layer 11a, the plurality of RF tags 10, and the second rubber sheet layer 11b are pressure-bonded and adhered to each other.

In the roller pressure-bonding step, it is sufficient for the first roller 3a to move relative to the stacked sheet. That is, in the roller pressure-bonding step, the position of the first roller 3a may be fixed, so that the stacked sheet can move (travel) relative to the first roller 3a, or the position of the stacked sheet may be fixed, so that the first roller 3a can move (travel) relative to the stacked sheet.

In the example of FIG. 4, the stacked sheet is passed between two rollers 3 (the first roller 3a and a second roller 3b) rotating relative to each other and caused to travel in the relative movement direction SR (opposite to the relative movement direction RM of the first roller 3a, when the orientation is considered). The stacked sheet is thus caused to move (travel) relative to the first roller 3a, while the position of the first roller 3a is fixed. However, it is also possible to fix the position of the stacked sheet on the stand 2 and cause the first roller 3a to move (travel) on the stacked sheet in the relative movement direction RM of the first roller 3a, without using the second roller 3b, so that the first roller 3a can move (travel) relative to the stacked sheet, while the position of the stacked sheet is fixed. In the example of FIG. 4, because the first roller 3a does not actually move (travel), the relative movement direction RM of the first roller 3a is indicated by dotted lines in FIG. 4.

The material of the first roller 3a (excluding a shaft body that serves as the rotation axis) may be freely determined without particular limitation.

For example, the first roller 3a (excluding the shaft that serves as the rotation axis) can have a surface made of a metallic material, such as iron, and coated with flexible resin, such as urethane. In this case, the urethane coating or the like increases the flexibility of the roller surface, so that the roller can sufficiently follow the shape change of the second rubber sheet layer 11b during roller pressing, thus being capable of more effectively pressure-bonding the first rubber sheet layer 11a, the plurality of RF tags 10, and the second rubber sheet layer 11b to each other.

In a case in which the second roller 3b is also used as illustrated in FIG. 4, the above description for the first roller 3a also applies to the second roller 3b.

The diameter of the first roller 3a may be freely determined without particular limitation, as long as the first roller 3a is configured so that the first rubber sheet layer 11a and the second rubber sheet layer 11b (refer to FIG. 4) that are spaced apart from each other in the up and down direction via a gap S between adjacent RF tags 10 can contact each other in accordance with the relative movement of the first roller 3a. However, from the viewpoint of sufficiently removing air inside the gaps S (i.e., from the viewpoint of air removal) in accordance with the relative movement of the first roller 3a, the diameter of the first roller 3a is preferably determined so that the first roller 3a falls completely into a gap S between adjacent RF tags 10 (i.e., so that it does not contact with the second rubber sheet layer 11b on the two RF tags 10 adjacent to each other via the gap S).

In a case in which the second roller 3b is also used as illustrated in FIG. 4, the above description for the first roller 3a also applies to the second roller 3b.

(RF Tag Laminate Cutting Step)

In the RF tag laminate cutting step performed after the roller pressure-bonding step, although not illustrated, a plurality of portions, each including the first rubber sheet layer 11a, one RF tag 10, and the second rubber sheet layer 11b, are cut from the stacked sheet in which the first rubber sheet layer 11a, the plurality of RF tags 10, and the second rubber sheet layer 11b are pressure-bonded to each other and stacked, as finished products of RF tag laminates 1, and thus, a plurality of RF tag laminates 1 are obtained (Step S105).

In the RF tag laminate cutting step, the RF tag laminates can be cut by any method without particular limitation. In one example, the RF tag laminates 1 may be cut from the aforementioned stacked sheet by die-cutting. In another example, the RF tag laminates 1 may be cut from the aforementioned stacked sheet by cutting between adjacent RF tags 10 in the stacked sheet using a knife or the like.

Next, advantageous effects of the method of manufacturing RF tag laminates according to an embodiment of the present disclosure described above will be explained.

First, according to the present embodiment, the plurality of RF tags 10 are placed on the first rubber sheet layer 11a in the RF tag arranging step, and the second rubber sheet layer 11b is stacked on the first rubber sheet layer 11a and the plurality of RF tags 10 in the second rubber sheet layer stacking step. This allows the plurality of RF tag laminates 1 to be obtained at once in the subsequent RF tag laminate cutting step or the like. Compared to a case in which each RF tag laminate 1 is obtained one by one, by preparing the first rubber sheet layer 11a with a certain shape, one RF tag 10, and the second rubber sheet layer 11b with a certain shape and stacking them, the productivity of the RF tag laminates 1 can be improved. In other words, according to the present embodiment, the RF tag laminates 1 can be obtained with high productivity.

Second, according to the present embodiment, the plurality of RF tags 10 are arranged on the first rubber sheet layer 11a in the RF tag arranging step, in a manner such that the long sides 10aL of the rectangular shape of the respective IC chip 10a of the plurality of RF tags 10 are inclined with respect to the direction RMV orthogonal to the relative movement direction RM of the first roller 3a (that is, in a manner such that the inclination angle θ of the long-side direction LD with respect to the direction RMV is not 0°) in the plan view (FIG. 3).

The advantageous effect of this will be described in detail below. Additionally, in the following explanation, the front side of the relative movement direction RM of the first roller 3a (the left side in FIGS. 3 to 5) is also simply referred to as the "front side," and the rear side of the relative movement direction RM of the first roller 3a (the right side in FIGS. 3 to 5) is also simply referred to as the "rear side."

Now, unlike the present embodiment described above, FIG. 6 illustrates a case in which the plurality of RF tags 10 are arranged on the first rubber sheet layer 11a in the RF tag arranging step, in a manner such that long sides 10aL of the rectangular shape of respective IC chips 10a of the plurality of RF tags 10 are not inclined with respect to the direction RMV orthogonal to the relative movement direction RM of the first roller 3a (i.e., in a manner such that the inclination angle θ of the long-side direction LD with respect to the direction RMV is 0°, and the long-side direction LD coincides with the direction RMV) in the plan view. The present inventor has conducted studies and found that in this case, even when the subsequent roller pressure-bonding step is performed, air remains in the vicinity of a rear-side end Sf (refer to FIGS. 3 and 4, and FIG. 6) of a gap S (in other words, the end of the gap S that is located adjacent to and in front of a rear-side IC chip 10a. Hereinafter, this is also referred to as the "end of the gap S that is located in front of the IC chip") between IC chips 10a included in adjacent RF tags 10 (the IC chips 10a have a predetermined thickness in the thickness direction TD, and thus the gap S with a certain volume exists), and the air cannot be easily removed. The reason why air remains in the vicinity of the end Sf of the gap S that is located in front of the IC chip and it cannot be easily removed is as follows. That is, air inside the gaps S is sequentially pushed toward the front side in accordance with the relative movement of the first roller 3a in the roller pressure-bonding step, but for each gap S, part of the first rubber sheet layer 11a and part of the second rubber sheet layer 11b that form the gap S on the front side adhere to each other first in accordance with the relative movement of the first roller 3a, and therefore air remains in the vicinity of the rear-side end Sf (the end of the gap S that is located in front of the IC chip) of the gap S. On the other hand, in the case of the example of FIG. 6, because the long sides 10aL of the IC chips 10a are not inclined with respect to the direction RMV (the inclination angle θ of the long-side direction LD with respect to the direction RMV is 0°) in the RF tag arranging step, in accordance with the relative movement in the roller pressure-bonding step, the first roller 3a reaches the entire area in the direction RMV of the end Sf of the gap S at the same time in the plan view (refer to FIG. 6), and air remaining in the vicinity of the end Sf of the gap S can hardly travel even when there is pressure caused by the relative movement of the first roller 3a. This is thought to be the reason why the air cannot be easily removed.

In contrast, in the present embodiment, because the long sides 10aL of the IC chips 10a are inclined with respect to the direction RMV (the inclination angle θ of the long-side direction LD with respect to the direction RMV is not 0°) in the RF tag arranging step, in accordance with the relative movement in the roller pressure-bonding step, the first roller 3a first reaches part of the end Sf of the gap S that is located on either one side in the direction RMV in the plan view (refer to FIG. 3), and the air in vicinity of the end Sf of the gap S travels toward either one side in the direction RMV due to pressure caused by the relative movement of the first roller 3a, and because of the antenna 10b (the first antenna 10b1 and/or the second antenna 10b2), discharge of the air to the outside is facilitated through the antenna 10b (the first antenna 10b1 and/or the second antenna 10b2).

In other words, according to the present embodiment, air escape during manufacturing of RF tag laminates 1 is facilitated, and air is prevented from remaining in the obtained RF tag laminates 1, so that highly durable RF tag laminates 1 can be obtained. Additionally, if air remains in the RF tag laminates 1, damage is caused to the RF tags 10 mainly by the air, and this in turn may reduce the durability of the RF tag laminates 1.

As described above, in the present embodiment, the antenna 10b (the first antenna 10b1 and the second antenna 10b2) also serves as an escape route for air when being compressed, and from this viewpoint, the antenna 10b (the first antenna 10b1 and/or the second antenna 10b2) preferably extends helically as illustrated in FIG. 2.

As has been described, according to the method of manufacturing RF tag laminates of the present embodiment, highly durable RF tag laminates 1 can be obtained with high productivity.

In the RF tag arranging step, it is preferable to arrange the plurality of RF tags 10 side-by-side on the first rubber sheet layer 11a, in a manner such that the long sides 10aL of the rectangular shape of the respective IC chips 10a face each other and are spaced apart, and in the roller pressure-bonding step, it is preferable to cause the first roller 3a to move on, and relative to, the first rubber sheet layer 11a, the plurality of RF tags 10, and the second rubber sheet layer 11b in the direction intersecting the long sides 10aL of the rectangular shape of the IC chips 10a.

According to the above configurations, compared to a case in which the plurality of RF tags 10 are arranged and spaced apart from each other on the first rubber sheet layer 11a in a manner such that each of them, in its entirety, extends in a straight line along the relative movement direction RM of the first roller 3a (in other words, in a manner such that the inclination angle θ of FIG. 3 is 90°) in the RF tag arranging step, the number of RF tag laminates obtained from the first rubber sheet layer 11a of the same length in the longitudinal direction increases, and thus, the productivity of RF tag laminates is further improved.

In the RF tag arranging step, the inclination angle θ of the long sides 10aL of the rectangular shape with respect to the direction RMV orthogonal to the relative movement direction RM of the first roller 3a in the roller pressure-bonding step is preferably 8 to 15° in the plan view.

According to the above configuration, as described above, air can be more effectively removed in the roller pressure-bonding step, and the production efficiency in the RF tag laminate cutting step or the like can be improved, so that highly durable RF tag laminates can be obtained more effectively and with high productivity.

In the plan view, the antenna 10b included in each RF tag 10, in its entirety in the longitudinal direction, preferably extends in the direction (i.e., the long side direction LD) parallel to the direction of extension of the long sides 10aL of the rectangular shape of the IC chip 10a.

According to the above configuration, because air can be more effectively removed in the roller pressure-bonding step, highly durable RF tag laminates can be more effectively obtained.

In the plan view of the RF tag arranging step, the first rubber sheet layer 11a is preferably in a strip shape having a predetermined width and extending in the longitudinal direction, and in the RF tag arranging step, the plurality of RF tags 10 are preferably arranged side-by-side along the longitudinal direction of the first rubber sheet layer 11a.

This enables efficient manufacturing of RF tag laminates, as described above.

Next, an RF tag laminate according to an embodiment of the present disclosure will be explained.

The RF tag laminate according to the embodiment of the present disclosure is manufactured by any method of manufacturing RF tag laminates described above.

The RF tag laminate according to the embodiment of the present disclosure is highly durable.

INDUSTRIAL APPLICABILITY

The RF tag laminate obtained by the method of manufacturing RF tag laminates according to the present disclosure is suitably used in any rubber articles, and particularly suitably used in tires.

REFERENCE SIGNS LIST

1 RF tag laminate
10 RF tag
10a IC chip
10aL Long side
10aS Short side
10b Antenna
10b1 First antenna
10b2 Second antenna
11 Coating rubber
11a First rubber sheet layer
11b Second rubber sheet layer
2 Stand
3 Roller
3a First roller
3b Second roller
LD Long-side direction
SD Short-side direction
TD Thickness direction
RM Relative movement direction of first roller
RMV Direction orthogonal to relative movement direction of first roller
SR Relative movement direction of stacked sheet
S Gap
Sf End of gap in front of IC chip
θ Inclination angle

The invention claimed is:

1. A method of manufacturing radio frequency (RF) tag laminates that each includes: an RF tag that has an integrated circuit (IC) chip with a rectangular shape in a plan view, and an antenna connected to at least one of short sides of the rectangular shape of the IC chip; and coating rubber that is stacked on the RF tag so as to coat an outer surface of the RF tag, the method comprising:

an RF tag arranging step of arranging a plurality of RF tags on a first rubber sheet layer, which is to form part of the coating rubber;

a second rubber sheet layer stacking step, performed after the RF tag arranging step, of stacking a second rubber sheet layer, which is to form another part of the coating rubber, on the first rubber sheet layer and the plurality of RF tags; and a roller pressure-bonding step, performed after the second rubber sheet layer stacking step, of pressure-bonding the first rubber sheet layer, the plurality of RF tags, and the second rubber sheet layer to each other using a first roller configured to move on, and relative to, the first rubber sheet layer, the plurality of RF tags, and the second rubber sheet layer, wherein in the RF tag arranging step, the plurality of RF tags are arranged on the first rubber sheet layer in a manner such that long sides of the rectangular shape of the IC chip of each RF tag in the plurality of RF tags are inclined with respect to a direction orthogonal to a relative movement direction of the first roller in the plan view, the RF tag arranging step further comprises arranging the plurality of RF tags side-by-side such that long sides of the IC chips of adjacent RF tags of the plurality of RF tags face each other and such that the plurality of RF tags are spaced apart from each other by an empty gap without overlapping in the relative movement direction of the first roller, and in the roller pressure-bonding step, the first roller moves on, and relative to, the first rubber sheet layer, the plurality of RF tags, and the second rubber sheet layer in a direction intersecting the long sides of the IC chips.

2. The method according to claim 1, wherein an inclination angle of the long sides of the rectangular shape with respect to the direction orthogonal to the relative movement direction of the first roller in the RF tag arranging step is 8 to 15° in the plan view.

3. The method according to claim 1, wherein the antenna of the RF tag, in an entirety thereof in a longitudinal direction, extends in a direction parallel to a direction of extension of the long sides of the rectangular shape of the IC chip in the plan view.

4. The method according to claim 1, wherein in the plan view of the RF tag arranging step, the first rubber sheet layer is in a strip shape having a predetermined width and extending in a longitudinal direction, and in the RF tag arranging step, the plurality of RF tags are arranged side-by-side along the longitudinal direction of the first rubber sheet layer.

5. The method according to claim 2, wherein the antenna of the RF tag, in an entirety thereof in a longitudinal direction, extends in a direction parallel to a direction of extension of the long sides of the rectangular shape of the IC chip in the plan view.

6. The method according to claim 2, wherein in the plan view of the RF tag arranging step, the first rubber sheet layer is in a strip shape having a predetermined width and extending in a longitudinal direction, and in the RF tag arranging step, the plurality of RF tags are arranged side-by-side along the longitudinal direction of the first rubber sheet layer.

7. The method according to claim 3, wherein in the plan view of the RF tag arranging step, the first rubber sheet layer is in a strip shape having a predetermined width and extending in a longitudinal direction, and in the RF tag arranging step, the plurality of RF tags are arranged side-by-side along the longitudinal direction of the first rubber sheet layer.

8. The method according to claim 1, wherein in the roller pressure-bonding step, the first roller falls completely into a gap between adjacent two RF tags of the plurality of the RF tags without contacting parts of the second rubber sheet layer which cover the adjacent two RF tags.

9. The method according to claim 3, wherein the antenna of the RF tag helically extends in the longitudinal direction.

* * * * *